United States Patent
Kapinos et al.

(10) Patent No.: US 11,277,402 B2
(45) Date of Patent: Mar. 15, 2022

(54) TWO FACTOR AUTHENTICATION USING A DIGITAL ONE-TIME PAD

(71) Applicant: Lenovo (Singapore) Pte. Ltd., Singapore (SG)

(72) Inventors: Robert J. Kapinos, Durham, NC (US); Robert Norton, Raleigh, NC (US); Russell Speight VanBlon, Raleigh, NC (US); Scott W. Li, Cary, NC (US)

(73) Assignee: Levono (Singapore) Pte. Ltd., Singapore (SG)

( * ) Notice: Subject to any disclaimer, the term of this patent is extended or adjusted under 35 U.S.C. 154(b) by 133 days.

(21) Appl. No.: 16/738,865

(22) Filed: Jan. 9, 2020

(65) Prior Publication Data

US 2021/0218734 A1 Jul. 15, 2021

(51) Int. Cl.
| | |
|---|---|
| *H04L 29/06* | (2006.01) |
| *H04L 9/32* | (2006.01) |
| *G06F 21/31* | (2013.01) |
| *G06F 21/42* | (2013.01) |

(52) U.S. Cl.
CPC ........ *H04L 63/0838* (2013.01); *H04L 9/3228* (2013.01); *G06F 21/31* (2013.01); *G06F 21/42* (2013.01); *H04L 9/32* (2013.01)

(58) Field of Classification Search
CPC ..... H04L 63/0838; H04L 9/32; H04L 9/3228; H04L 2463/082; G06F 21/31; G06F 21/42

See application file for complete search history.

(56) References Cited

U.S. PATENT DOCUMENTS

| | | | | |
|---|---|---|---|---|
| 8,904,482 | B1 * | 12/2014 | Dotan | H04L 63/0853 726/2 |
| 2009/0037992 | A1 * | 2/2009 | Smith | H04L 63/0853 726/6 |
| 2011/0321146 | A1 * | 12/2011 | Vernon | H04L 9/3228 726/7 |
| 2019/0246170 | A1 * | 8/2019 | Sreekanth | H04L 63/102 |
| 2021/0211416 | A1 * | 7/2021 | Mossoba | G06F 21/42 |

* cited by examiner

*Primary Examiner* — Jayesh M Jhaveri
(74) *Attorney, Agent, or Firm* — VanLeeuwen & VanLeeuwen; Jason A. Friday (57) ABSTRACT

An approach is provided that receives a login request from a selected user. The approach first authenticates the selected user using a unique user identifier and a password associated with the selected user. In response to a successful first authentication, the approach performs a second authentication of the selected user using a second factor authentication code that was included in the login request. The second authentication includes retrieval of an expected second factor authentication code using an index into a block of codes with the index and the block of codes both being associated with the selected user. The login request is allowed and the index is changed in response to the second factor authentication code matching the expected second factor authentication code. The login request is denied in response to the second factor authentication code failing to match the expected second factor authentication code.

20 Claims, 6 Drawing Sheets

TWO FACTOR AUTHENTICATION USING A DIGITAL ONE-TIME PAD

BACKGROUND

Two factor authentication is becoming the norm for any high security or suspicious login circumstances. True two factor authentication requires that the user "know something" and "have something" in order to authenticate the user to the system. However, most 'two factor' authentication schemes actually fall short of true two factor authentication wherein the users knows a password and the service sends the user a code or other item that is needed to complete the two factor authentication. Additionally, these ad-hoc transactions are not necessarily sent through secure means. In practice, they are often totally unprotected channels such as Short Message Service (SMS) or other less than secure communications channel. Such transmissions can be intercepted or gained by clever hackers "phishing" for the information, which destroys the stated purpose of having a second authentication factor.

Other second authentication factor approaches have other challenges. Carry around "fobs" that show a number that needs to be entered as the second authentication factor are easily lost and then prevent the authorized user from logging on to the service. Phone apps can also be used for transmission of the second authentication factor, but these apps are usually not secured as they have to contact the security service over less than secure communication channels. In addition, if a user loses or otherwise misplaces his or her mobile phone, the authorized user is once again prevented from logging on to the service.

SUMMARY

An approach is provided that receives a login request from a selected user. The approach first authenticates the selected user using a unique user identifier and a password associated with the selected user. In response to a successful first authentication, the approach performs a second authentication of the selected user using a second factor authentication code that was included in the login request. The second authentication includes retrieval of an expected second factor authentication code using an index into a block of codes with the index and the block of codes both being associated with the selected user. The login request is allowed and the index is changed in response to the second factor authentication code matching the expected second factor authentication code. The login request is denied in response to the second factor authentication code failing to match the expected second factor authentication code.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein.

DETAILED DESCRIPTION

The figures show an approach that provides the user's device (e.g., laptop, tablet, etc.) receiving a large block (e.g., 20,000) of codes, such as random numbers. The block of codes are received through a secure channel, prior to ever logging in to a service, and stored on the user's device. The block is unique for every user with the service retaining a copy of the block that was issued with every user's device. The block is read as a loop buffer so that the start location is known only to the user's device and the service. In this manner, if a malevolent entity were to gain access to the block of codes, they would not be able to determine which of the codes is the next code to use during the two-factor authentication process. When the random block is issued, the user is also issued a starting code which serves as both an index into the loop buffer and security to issue a new one-time code. In one embodiment, the index is stored in a secure memory area (e.g., encrypted, etc.).

Both the local (user) device and the login service keep a track of the number of successful logins. At each login, the user enters the memorized starting code (e.g., the initial index, etc.). Using the starting code and the number of log-ins determines current code from the block that is needed as the second authentication factor. The device retrieves a one-time code from the block of codes that will only work for this login. To log into the service, the user presents both his user identifier/password as well as the correct one-time code that was retrieved from the block of codes for that login. Each time the user logs in or fails login, a new code is needed. In this way, the device stay synchronized with the login service.

For lockout and recovery, after proving his identity, the user is issued, though a secure channel, a new index into the random table. In some embodiments, the block of codes is refreshed periodically to not go stale.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 1:
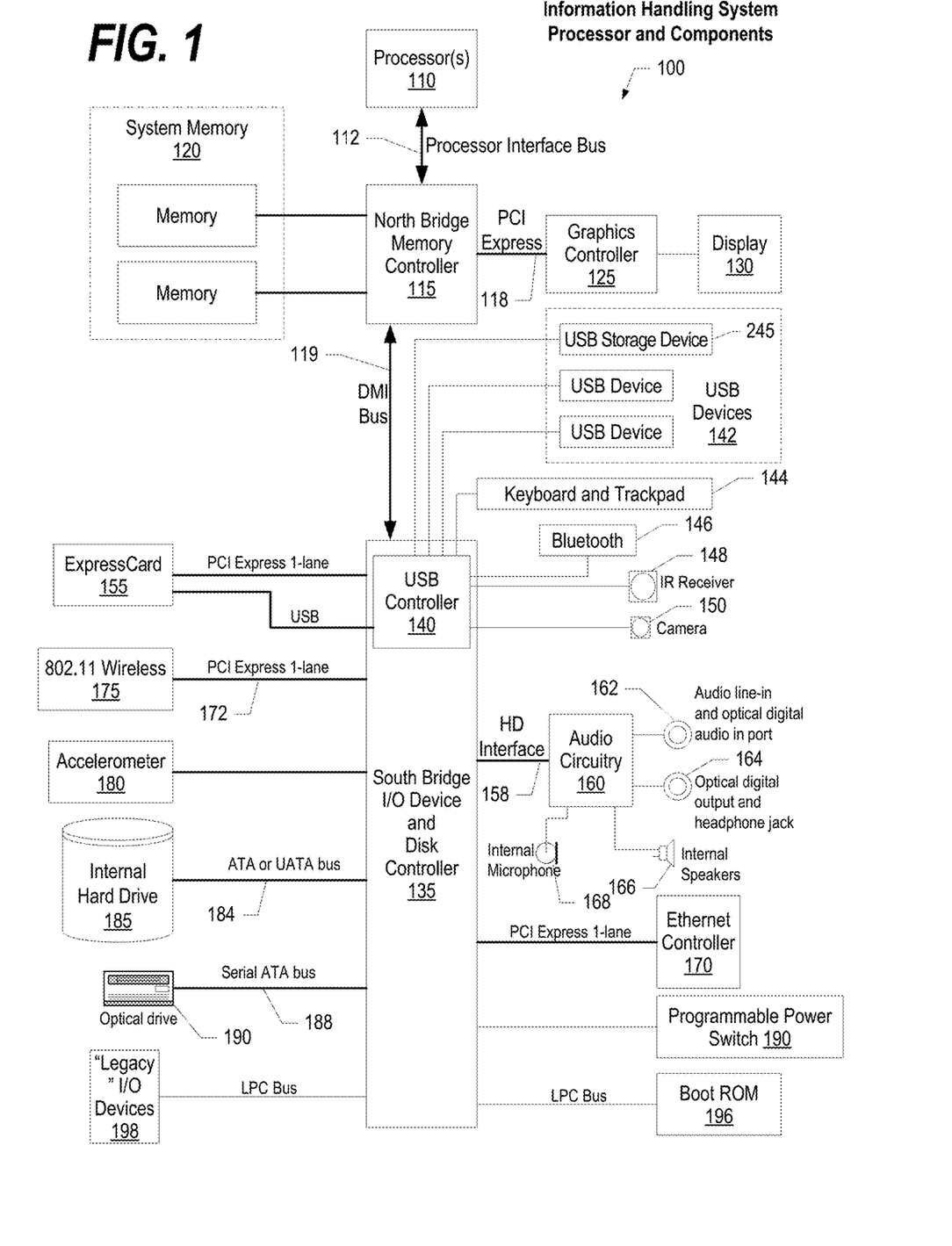
FIG. 1 is a block diagram of a data processing system in which the methods described herein can be implemented.
Figure 2:
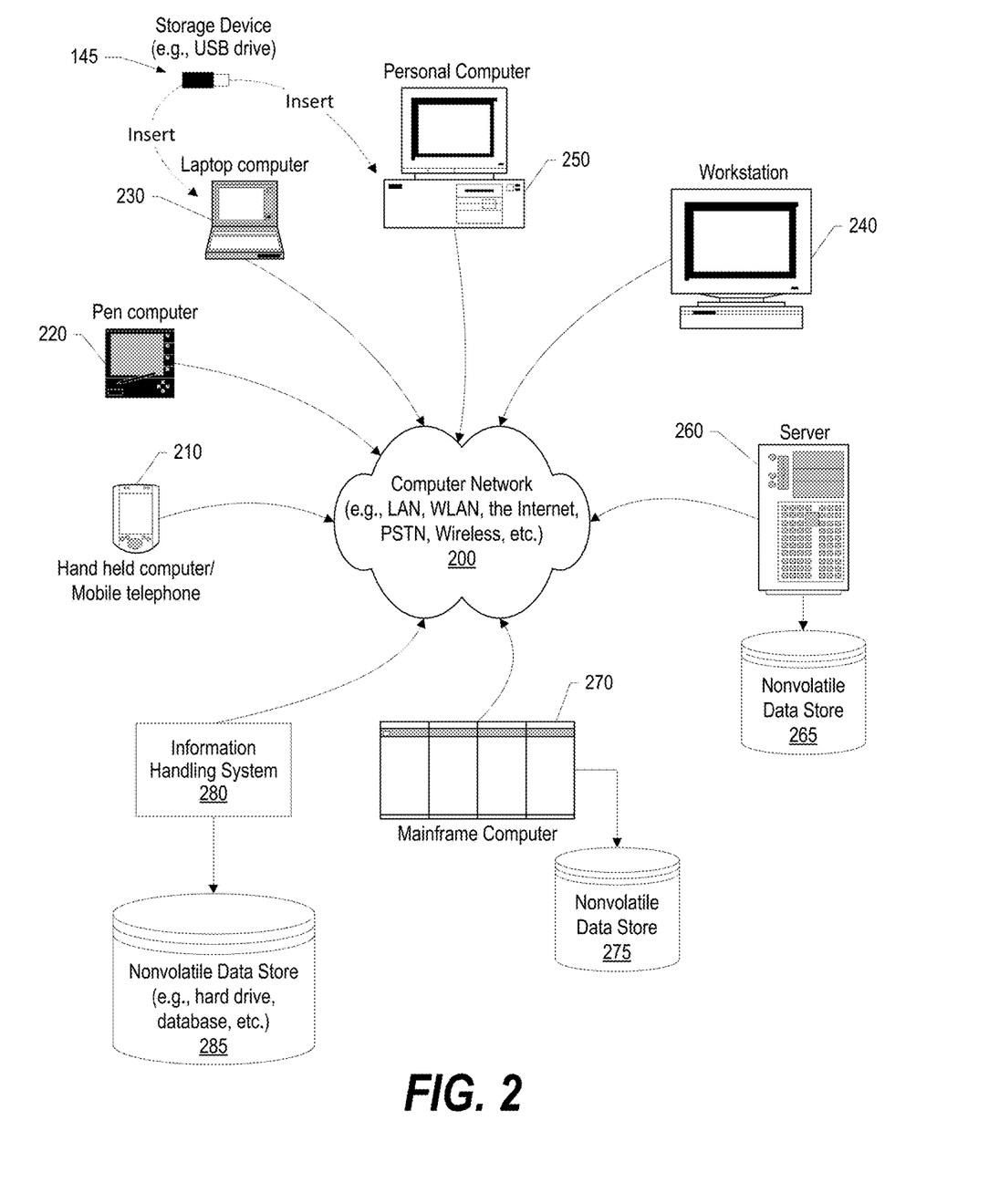
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a device that is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Accelerometer 180 connects to Southbridge 135 and measures the acceleration, or movement, of the device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may be a device that can take many forms. For example, an information handling system may take the form of a desktop device, server device, portable device, laptop device, notebook device, or other form factor device. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of devices that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling system devices include pen, or tablet, device 220, laptop, or notebook, device 230, workstation device 240, personal computer system device 250, and server device 260. Other types of information handling system devices that are not individually shown in FIG. 2 are represented by information handling system device 280. As shown, the various information handling system devices can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
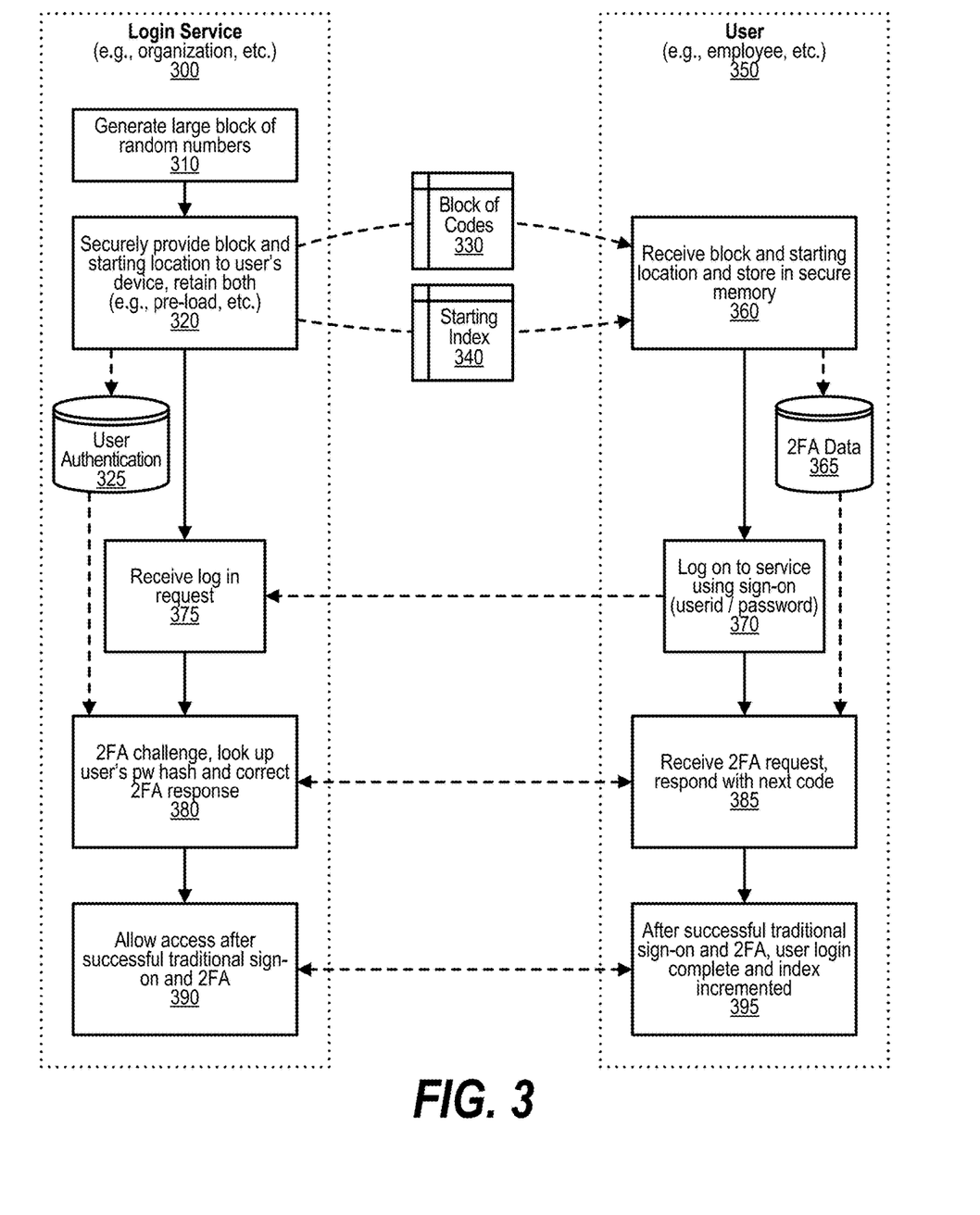
FIG. 3 is a component diagram depicting the components used in providing two-factor authentication using a block of random codes.

FIG. 3 is a component diagram depicting the components used in providing two-factor authentication using a block of random codes. FIG. 3 processing commences with login service 300, such as a login service used by an organization, website, or the like. At step 310, the login service process generates a large block of random codes, such as random numbers, and these numbers are stored in memory area 330 and transmitted to user device 350, such as a laptop, tablet, or other device that is used by a user of the login service. In addition, an index to a random location within the block of codes is generated as the starting index that will be used by both the login service and the user device to perform the two factor authentication process. This starting index is stored in memory area 340 with both the block of codes (330) and starting index 340 being securely transmitted to user device 350.

At step 320, the login service process securely provides the random block of codes and the starting index that references the initial code from the block of codes to user's device 350. In addition, the login service retains both the generated block of codes and the starting index in data store 325 with data store 325 being accessed to perform the two-factor authentication when the user requests to logon to the service.

Turning to user device processing, at step 360, the user device process securely receives the block of codes and the starting index (initial block location within the block of codes) and stores both the in a secure memory, shown as data store 365. In one embodiment, the block of codes does not need to be stored in a secure memory because the list of codes is quite large (e.g., 20,000 or more, etc.) and is virtually worthless to a malevolent user without knowing the current index that indicates the particular code within the block of codes that is needed as the second authentication factor. In this embodiment, the index is stored in a secure memory location (e.g., encrypted, etc.) on user device 350 so that it is inaccessible to a hacker or other malevolent user. At step 370, the user device process logs on to service using a traditional sign-on methodology as the first authentication factor (e.g., user identifier and password combination, etc.).

Returning to login service processing, at step 375, the login service process receives the log in request from user device 350 with the user's user identifier and password. At step 380, the login service process initiates the two-factor authentication challenge after first authenticating the user with the provided user identifier and password. Having successfully passed the first authentication, the login service now retrieves the second authentication factor from data store 325 by retrieving the block of codes generated for this user and, more particularly, retrieving the expected code from the block of codes based on the index that was stored in the user authentication file.

Returning to user device processing, at step 385, the user device process receives the two-factor authentication request from the login service, retrieves the particular code from the two-factor authentication data from data store 365, and responds to the login service with the code from the block of codes referenced by the index.

Returning to login service processing, at step 390, the login service process allows user device 350 access to the system upon successful traditional sign-on and authentication of the code returned by the user device as the second authentication factor. Upon successful login by the user device, the login service also changes (e.g., increments, etc.) the index in order to reference a different code from the block of codes for the next second authentication factor to use the next time this user logs onto the system.

Returning to user device processing, at step 395, the user device process changes (e.g., increments, etc.) the index after the user is successfully logged onto the system with the index being changed on the user device in the same manner that the index was changed at the login service so that both indexes are the same and both reference the same code from the block of codes that will be used the next time that the second authentication factor is requested from the user's device.

Figure 4:
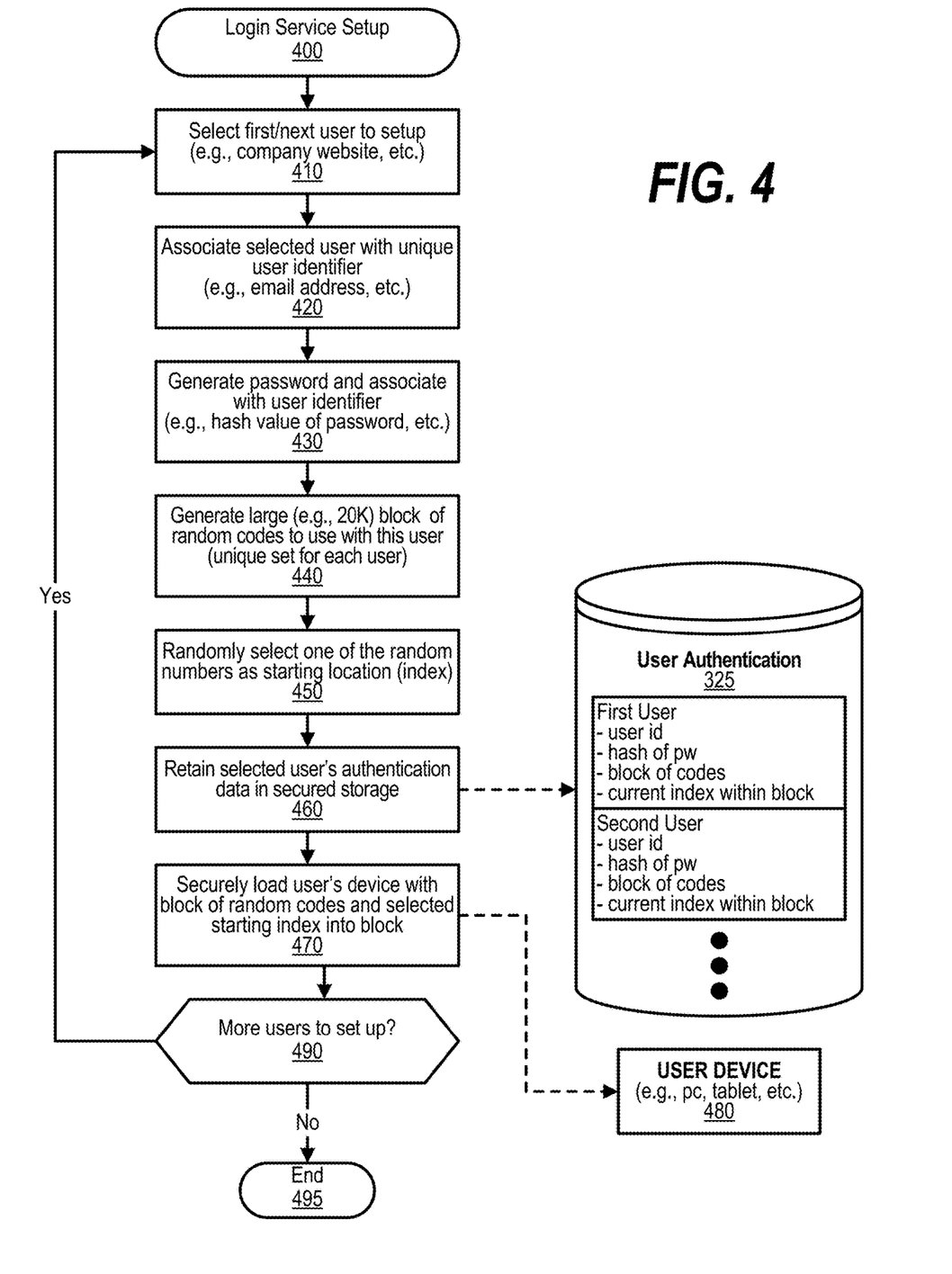
FIG. 4 is a flowchart showing steps taken by a process sets up the block of codes unique for a user device and used as a second authentication factor.

FIG. 4 is a flowchart showing steps taken by a process sets up the block of codes unique for a user device and used as a second authentication factor. FIG. 4 processing commences at 400 and shows the steps taken by a setup process performed by a login service. At step 410, the login service setup process selects the first user to setup to use the login service (e.g., login service provided by an organization website, etc.). At step 420, the login service setup process associates the selected user with a unique user identifier that will be used by the user during the login process. For example, the user identifier might be the user's unique email address, or other unique identifier. At step 430, the login service setup process generates a password and associates the generated password with the user identifier. In one embodiment, the password is provided to the user or might be selected by the user with the login service retaining a hash value of the password instead of retaining the actual password.

At step 440, the login service setup process generates a large block of random codes to use with this user. For example, the block might be a block of 20,000 or more unique codes, such as random numbers. In one embodiment, a unique block of codes is generated for each user so that the theft of one copy of a block of codes from one user device poses zero security threat to other user devices. In addition, the current index into the block of codes is stored in secure memory on the user's device making theft of the index extremely difficult. As the index value is not transmitted between the login service and the user device, with only the random code found by the index being transmitted, theft of the block of codes poses little threat even to the device from which it was stolen as the block of codes is virtually meaningless without having the index to the current code within the block.

At step 450, the login service setup process randomly selects one of the codes in the block of codes as the starting location (index). In the example of the block of codes including some 20,000 unique codes, the starting index might be 5,927 so that the 5,927th code within the block will be used as the initial code used for the second authentication factor. At step 460, the login service setup process retains the selected user's authentication data in secured data store 325 with this data including the user's identifier, the user's password (or resulting hash value), the block of codes generated for this user device, and the initial (or current) index that references the initial code within the block that will be used as the initial second authentication factor when the user performs the login process.

At step 470, the login service setup process securely loads user device 480 with the block of random codes and the selected starting index that references the initial code within the block of codes. The secure load might be performed in an Information Technology (IT) area that has a technician load the block of codes and index to the nonvolatile storage of user device 480. In one embodiment, the data, especially the index, is stored in a secure memory area of user device 480 (encrypted, etc.) to help ensure that the index is not stolen by a hacker or other malevolent user. The secure load could also be performed by creating a secure communications tunnel (e.g., Secure Socket Layers (SSL), etc.) established between the login service setup process and a process running on user device 480 with the block of codes and index being transmitted using this secure communications tunnel.

The login service setup process determines as to whether there are more users to set up to use the login service (decision 490). If there are more users to set up to use the login service, then decision 490 branches to the 'yes' branch which loops back to step 410 to select and process the next user as described above. This looping continues until there are no more users to set up to use the login service, at which point decision 490 branches to the 'no' branch exiting the loop and setup processing ends at 495.

Figure 5:
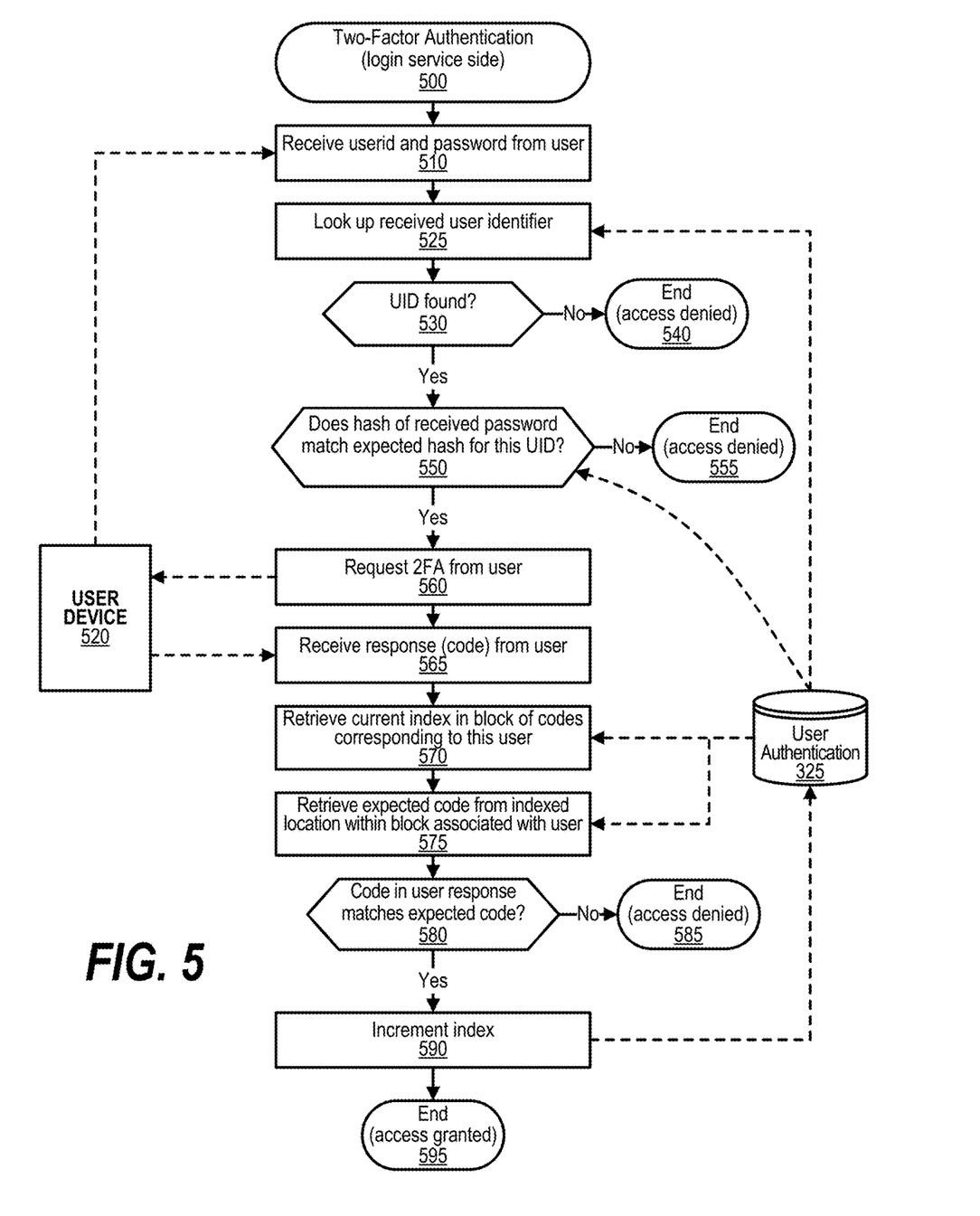
FIG. 5 is a flowchart showing steps taken by a process running on the service that authenticates login requests from user devices including verification of second authentication factors that use a block of preloaded random codes.

FIG. 5 is a flowchart showing steps taken by a process running on the service that authenticates login requests from user devices including verification of second authentication factors that use a block of preloaded random codes. FIG. 5 processing commences at 500 and shows the steps taken by a login service process that handles a two-factor authentication process using a block of codes as the second authentication factor. At step 510, the login service process receives a user identifier and password from user device 520. At step 525, the login service process looks up the received user identifier in data store 325.

The process determines as to whether the user identifier was found in the system's user authentication data store 325 (decision 530). If the user identifier was found, then decision 530 branches to the 'yes' branch for further processing. On the other hand, if the user identifier was not found, then decision 530 branches to the 'no' branch whereupon processing ends at 540 with access to the requestor being denied.

The process next determines as to whether the password provided by the user is correct with, in one embodiment, a hash of the input password being compared to the password hash value stored in data store 325 (decision 550). If the password provided by the user is correct, then decision 550 branches to the 'yes' branch for further processing. On the other hand, if the password provided by the user is incorrect, then decision 550 branches to the 'no' branch whereupon processing ends at 555 with access to the requestor being denied.

At step 560, the login service process requests the second authentication factor from user device 520. At step 565, the login service process receives a code from the user device responsive to the request for the second authentication factor. At step 570, the login service process retrieves the current index for this user and then uses the current index to retrieve the expected code from the block of codes corresponding to this user. Both the current index and the block of codes are retrieved from data store 325. At step 575, the login service process retrieves the expected code from the indexed location within the block of codes that is associated with this user.

The process determines whether the code in the user's response matches the login service's expected code (decision 580). If the code in the user's response matches the login service's expected code, then decision 580 branches to the 'yes' branch whereupon, at step 590, the index is changed (e.g., incremented, etc.) and stored in data store 325 with the new index referencing the next code from the block of codes that will be required the next time this user logs onto the system, and processing ends at 595 by granting the user access to the system after a successful two-factor login process. On the other hand, if not code in user response matches expected code, then decision 580 branches to the 'no' branch whereupon processing ends at 585 with access to the requestor being denied.

Figure 6:
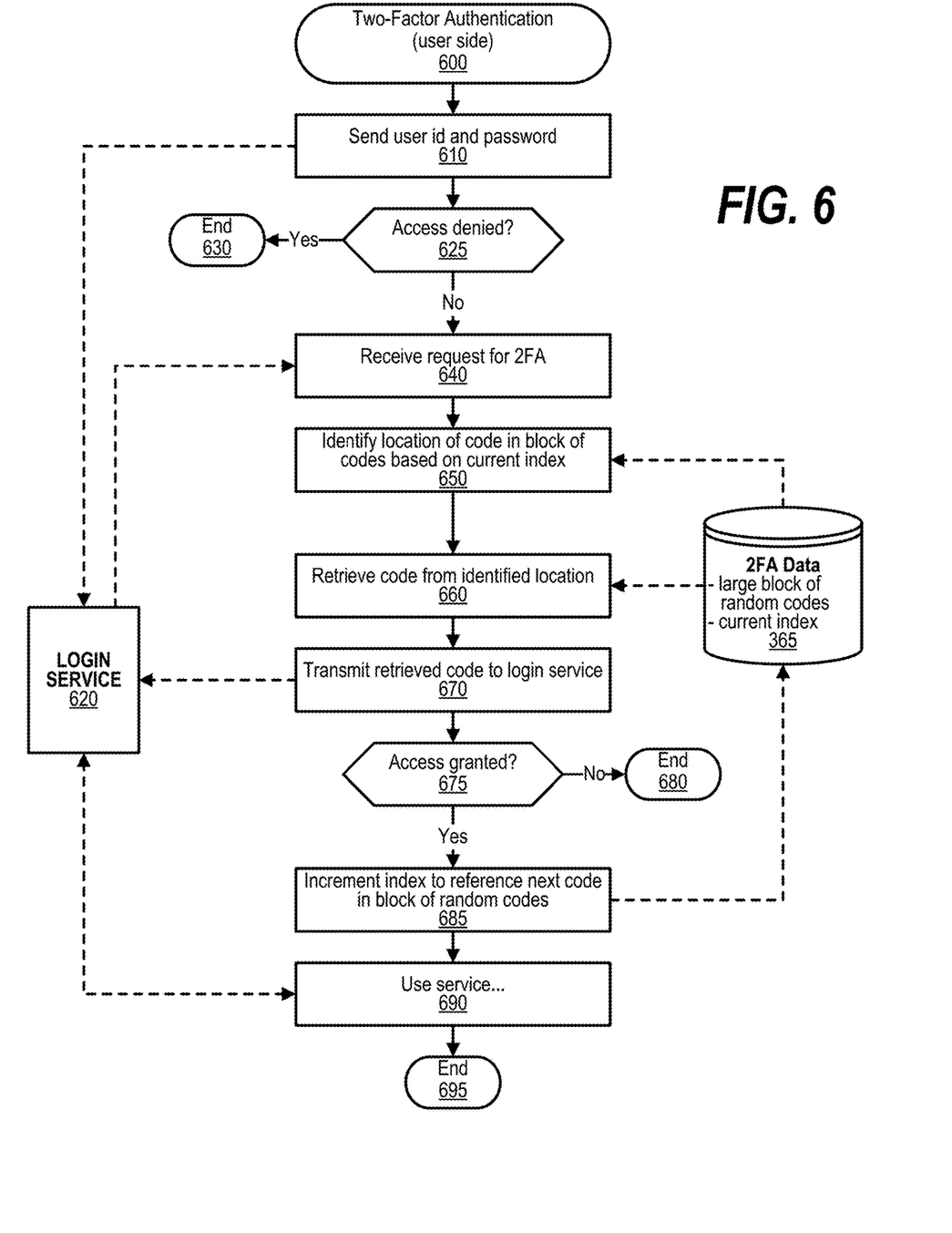
FIG. 6 is a flowchart showing steps taken by a process running on the user device that provides user login credentials and second authentication factors that use a block of preloaded random codes to the login service.

FIG. 6 is a flowchart showing steps taken by a process running on the user device that provides user login credentials and second authentication factors that use a block of preloaded random codes to the login service. FIG. 6 processing commences at 600 and shows the steps taken by a user device process that performs a two-factor authentication routine (user side of the process shown in FIG. 5). At step 610, the user device process sends the user's user identifier and password to login service 620.

The user device process determines whether access was denied by the login service based on the user identifier and/or password (decision 625). If access was denied, then decision 625 branches to the 'yes' branch whereupon processing ends at 630. On the other hand, if access was not denied, then decision 625 branches to the 'no' branch for further processing.

At step 640, the user device process receives a request for the second factor authentication code from login service 620. At step 650, the user device process identifies the location of the authentication code in the block of codes with the location being based on current index. Both the current index and the block of codes are retrieved from data store 365. As previously mentioned, in one embodiment, the index is stored securely (e.g., encrypted, etc.) to prevent use by hackers or other malevolent users.

At step 660, the user device process retrieves the code from the block of codes at the location identified by the current index. At step 670, the user device process transmits the retrieved code to login service 620.

The user device process determines as to whether access was granted by the login service after receipt of the second factor authentication code (decision 675). If access was granted, then decision 675 branches to the 'yes' branch for further processing. On the other hand, if access was not granted, then decision 675 branches to the 'no' branch whereupon processing ends at 680.

If access was granted by the login service then, at step 685, the user device process changes the index to reference the next code in the block of codes that will be used the next time that the user device logs into the system using the login service. At step 690, the user uses the desired service and, FIG. 6 processing thereafter ends at 695.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. As used herein, a computer readable storage medium does not include a transitory signal.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While particular embodiments have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to others containing only one such element, even when the same claim includes the introductory phrases "one or more" or "at least one" and indefinite articles such as "a" or "an"; the same holds true for the use in the claims of definite articles.

What is claimed is:

1. A method, implemented by an information handling system comprising a processor, a memory accessible by the processor, and a network interface connecting the information handling system to a computer network, the method comprising:

receiving a transmission of a login request from a selected user, wherein the login request includes a unique user identifier, a password, and a second factor authentication code and does not include an index;

first authenticating the selected user using the unique user identifier and the password; and in response to a successful first authentication, second authenticating the selected user using the second factor authentication code, the second authenticating further comprising:

retrieving an expected second factor authentication code using the index into a block of codes, wherein both the index and the block of codes are retrieved from a storage location accessible from the information handling system and wherein both are associated with the selected user;

allowing the login request and changing the index in response to the second factor authentication code matching the expected second factor authentication code; and denying the login request in response to the second factor authentication code failing to match the expected second factor authentication code.

2. The method of claim 1 further comprising:

prior to receiving the login request, generating the block of codes and the index that initially references a random one of the codes;

storing the block of codes and the index in the memory; and securely transmitting the block of codes and the index to a selected user device associated with the selected user where a copy of the block of codes and a copy of the index are stored in a memory area of the selected user device.

3. The method of claim 2 further comprising:

in response to a successful log in by the selected user at the selected user device, changing the copy of the index stored in the memory area of the selected user device the same as the changing of the index.

4. The method of claim 3 wherein the changing of the index and the changing of the copy of the index are performed by incrementing both the index and the copy of the index.

5. The method of claim 1 wherein the selected user is selected from a plurality of users, the method further comprising:

generating a plurality of blocks of codes with one of the plurality being the block of codes, wherein each of the plurality of users is associated with a different one of the plurality of blocks of codes; and generating a plurality indexes, wherein each of the plurality of indexes corresponds to a different one of the plurality of blocks of codes, and wherein each of the indexes reference a random location within the corresponding block of codes.

6. The method of claim 5 further comprising:

securely storing each of the plurality of blocks of codes and their respective corresponding index to a different user device, wherein each of the different user devices is associated with one of the plurality of users.

7. The method of claim 6 further comprising:

loading a two-factor authentication routine onto each of the user devices, wherein the two-factor authentication routine increments the index stored on the user device each time one of the plurality of users associated with the device performs a successful login.

8. An information handling system comprising:

one or more processors;

a memory coupled to at least one of the processors;

a storage location accessible by at least one of the processors;

a network interface that connects the information handling system to a computer network; and a set of computer program instructions stored in the memory and executed by at least one of the processors in order to perform actions comprising:

receiving a transmission of a login request from a selected user, wherein the login request includes a unique user identifier, a password, and a second factor authentication code and does not include an index;

first authenticating the selected user using the unique user identifier and the password; and in response to a successful first authentication, second authenticating the selected user using the second factor authentication code, the second authenticating further comprising:

retrieving an expected second factor authentication code using the index into a block of codes, wherein both the index and the block of codes are retrieved from a storage location accessible from the information handling system and wherein both are associated with the selected user;

allowing the login request and changing the index in response to the second factor authentication code matching the expected second factor authentication code; and denying the login request in response to the second factor authentication code failing to match the expected second factor authentication code.

9. The information handling system of claim 8 wherein the actions further comprise:

prior to receiving the login request, generating the block of codes and the index that initially references a random one of the codes;

storing the block of codes and the index in the memory; and securely transmitting the block of codes and the index to a selected user device associated with the selected user where a copy of the block of codes and a copy of the index are stored in a memory area of the selected user device.

10. The information handling system of claim 9 wherein the actions further comprise:

in response to a successful log in by the selected user at the selected user device, changing the copy of the index stored in the memory area of the selected user device the same as the changing of the index.

11. The information handling system of claim 10 wherein the changing of the index and the changing of the copy of the index are performed by incrementing both the index and the copy of the index.

12. The information handling system of claim 8 wherein the selected user is selected from a plurality of users, and wherein the actions further comprise:

generating a plurality of blocks of codes with one of the plurality being the block of codes, wherein each of the plurality of users is associated with a different one of the plurality of blocks of codes; and generating a plurality indexes, wherein each of the plurality of indexes corresponds to a different one of the plurality of blocks of codes, and wherein each of the indexes reference a random location within the corresponding block of codes.

13. The information handling system of claim 12 wherein the actions further comprise:

securely storing each of the plurality of blocks of codes and their respective corresponding index to a different user device, wherein each of the different user devices is associated with one of the plurality of users.

14. The information handling system of claim 13 wherein the actions further comprise:

loading a two-factor authentication routine onto each of the user devices, wherein the two-factor authentication routine increments the index stored on the user device each time one of the plurality of users associated with the device performs a successful login.

15. A computer program product comprising:
a computer readable storage medium, comprising computer program code that, when executed by an information handling system, executes actions comprising:
receiving a transmission of a login request from a selected user, wherein the login request includes a unique user identifier, a password, and a second factor authentication code and does not include an index;
first authenticating the selected user using the unique user identifier and the password; and
in response to a successful first authentication, second authenticating the selected user using the second factor authentication code, the second authenticating further comprising:
retrieving an expected second factor authentication code using the index into a block of codes, wherein both the index and the block of codes are retrieved from a storage location accessible from the information handling system and wherein both are associated with the selected user;
allowing the login request and changing the index in response to the second factor authentication code matching the expected second factor authentication code; and
denying the login request in response to the second factor authentication code failing to match the expected second factor authentication code.

16. The computer program product of claim 15 wherein the actions further comprise:
prior to receiving the login request, generating the block of codes and the index that initially references a random one of the codes;
storing the block of codes and the index in the memory; and
securely transmitting the block of codes and the index to a selected user device associated with the selected user where a copy of the block of codes and a copy of the index are stored in a memory area of the selected user device.

17. The computer program product of claim 16 wherein the actions further comprise:
in response to a successful log in by the selected user at the selected user device, changing the copy of the index stored in the memory area of the selected user device the same as the changing of the index.

18. The computer program product of claim 17 wherein the changing of the index and the changing of the copy of the index are performed by incrementing both the index and the copy of the index.

19. The computer program product of claim 15 wherein the selected user is selected from a plurality of users, and wherein the actions further comprise:
generating a plurality of blocks of codes with one of the plurality being the block of codes, wherein each of the plurality of users is associated with a different one of the plurality of blocks of codes; and
generating a plurality indexes, wherein each of the plurality of indexes corresponds to a different one of the plurality of blocks of codes, and wherein each of the indexes reference a random location within the corresponding block of codes.

20. The computer program product of claim 19 wherein the actions further comprise:
securely storing each of the plurality of blocks of codes and their respective corresponding index to a different user device, wherein each of the different user devices is associated with one of the plurality of users.

* * * * *